United States Patent
Chavarria Garcia et al.

(10) Patent No.: US 12,384,544 B2
(45) Date of Patent: Aug. 12, 2025

(54) PASSENGER SEAT ARMREST WITH A MULTI-ZONE TOP SURFACE

(71) Applicant: Safran Seats USA LLC, Gainesville, TX (US)

(72) Inventors: Daniel Abraham Chavarria Garcia, Chihuahua (MX); Jeremy Laurent, Saint-Mande (FR); Brice Bouffort, Paris (FR)

(73) Assignee: Safran Seats USA LLC, Gainesville, TX (US)

( * ) Notice: Subject to any disclaimer, the term of this patent is extended or adjusted under 35 U.S.C. 154(b) by 97 days.

(21) Appl. No.: 17/771,232

(22) PCT Filed: Dec. 2, 2019

(86) PCT No.: PCT/US2019/063965
§ 371 (c)(1),
(2) Date: Apr. 22, 2022

(87) PCT Pub. No.: WO2021/080628
PCT Pub. Date: Apr. 29, 2021

(65) Prior Publication Data
US 2022/0388433 A1    Dec. 8, 2022

Related U.S. Application Data

(60) Provisional application No. 62/925,864, filed on Oct. 25, 2019.

(51) Int. Cl.
*B64D 11/06* (2006.01)
*B60N 2/75* (2018.01)

(52) U.S. Cl.
CPC ............ *B64D 11/0646* (2014.12); *B60N 2/75* (2018.02); *B64D 11/0644* (2014.12)

(58) Field of Classification Search
CPC ............ B64D 11/0646; B64D 11/0644; B60N 2/793; B60N 2/75
See application file for complete search history.

(56) References Cited

U.S. PATENT DOCUMENTS 5,195,709 A * 3/1993 Yasushi .............. B64D 11/0627
248/584
5,350,217 A * 9/1994 Kanigowski ........... B64D 11/06
297/466

(Continued)

FOREIGN PATENT DOCUMENTS

DE    3925233 A1 * 1/1991 ............... B60N 2/75
EP    1078852 A2 * 2/2001 ......... B64D 11/0015

(Continued)

OTHER PUBLICATIONS

International Patent Application No. PCT/US2019/063965, International Search Report and Written Opinion, dated Jul. 20, 2020.

*Primary Examiner* — David R Dunn
*Assistant Examiner* — Tania Abraham
(74) *Attorney, Agent, or Firm* — Kilpatrick Townsend & Stockton LLP

(57) ABSTRACT

An armrest for a passenger seat has a forward end, an aft end opposite from the forward end, and a top surface extending from the forward end to the aft end. The top surface includes a first zone and a second zone, and a curvature of the first zone of the top surface is different from a curvature of the second zone of the top surface. In some examples, at least one of the first zone or the second zone has a concave curvature.

17 Claims, 10 Drawing Sheets

(56) References Cited

U.S. PATENT DOCUMENTS

| | | | |
|---|---|---|---|
| 9,986,841 B2 | 6/2018 | McMillan | |
| 10,569,732 B2* | 2/2020 | Nagasawa | B60R 21/207 |
| 2007/0241235 A1* | 10/2007 | Atchison | B64D 11/06 244/122 R |
| 2011/0043026 A1* | 2/2011 | Montalvo | B64D 11/0646 297/411.4 |
| 2011/0148156 A1* | 6/2011 | Westerink | B64D 11/06 108/134 |
| 2012/0025571 A1* | 2/2012 | Merensky | B64D 11/06 297/411.3 |
| 2013/0076082 A1* | 3/2013 | Herault | B60N 3/002 297/173 |
| 2014/0217798 A1* | 8/2014 | Negusse | B60N 2/77 297/411.3 |
| 2014/0252821 A1* | 9/2014 | Friedlander | B60N 3/002 297/232 |
| 2015/0210395 A1* | 7/2015 | Saint-Jalmes | B64D 11/0644 244/118.6 |
| 2016/0355265 A1* | 12/2016 | Shih | B64D 11/0644 |
| 2017/0088268 A1* | 3/2017 | Kinard | B64D 11/0646 |
| 2018/0105272 A1 | 4/2018 | Scott et al. | |
| 2018/0178700 A1 | 6/2018 | Welch et al. | |
| 2018/0281723 A1* | 10/2018 | Nagasawa | B60N 2/753 |
| 2019/0092475 A1* | 3/2019 | Carlioz | B64D 11/00153 |
| 2019/0106077 A1* | 4/2019 | Dry | B60N 2/79 |
| 2019/0184877 A1* | 6/2019 | Gomez | B60N 2/20 |
| 2019/0225342 A1* | 7/2019 | Boddu | B64D 11/06 |

FOREIGN PATENT DOCUMENTS

| | | | |
|---|---|---|---|
| EP | 3125726 A1 | 2/2017 | |
| GB | 796613 A | 6/1958 | |

* cited by examiner

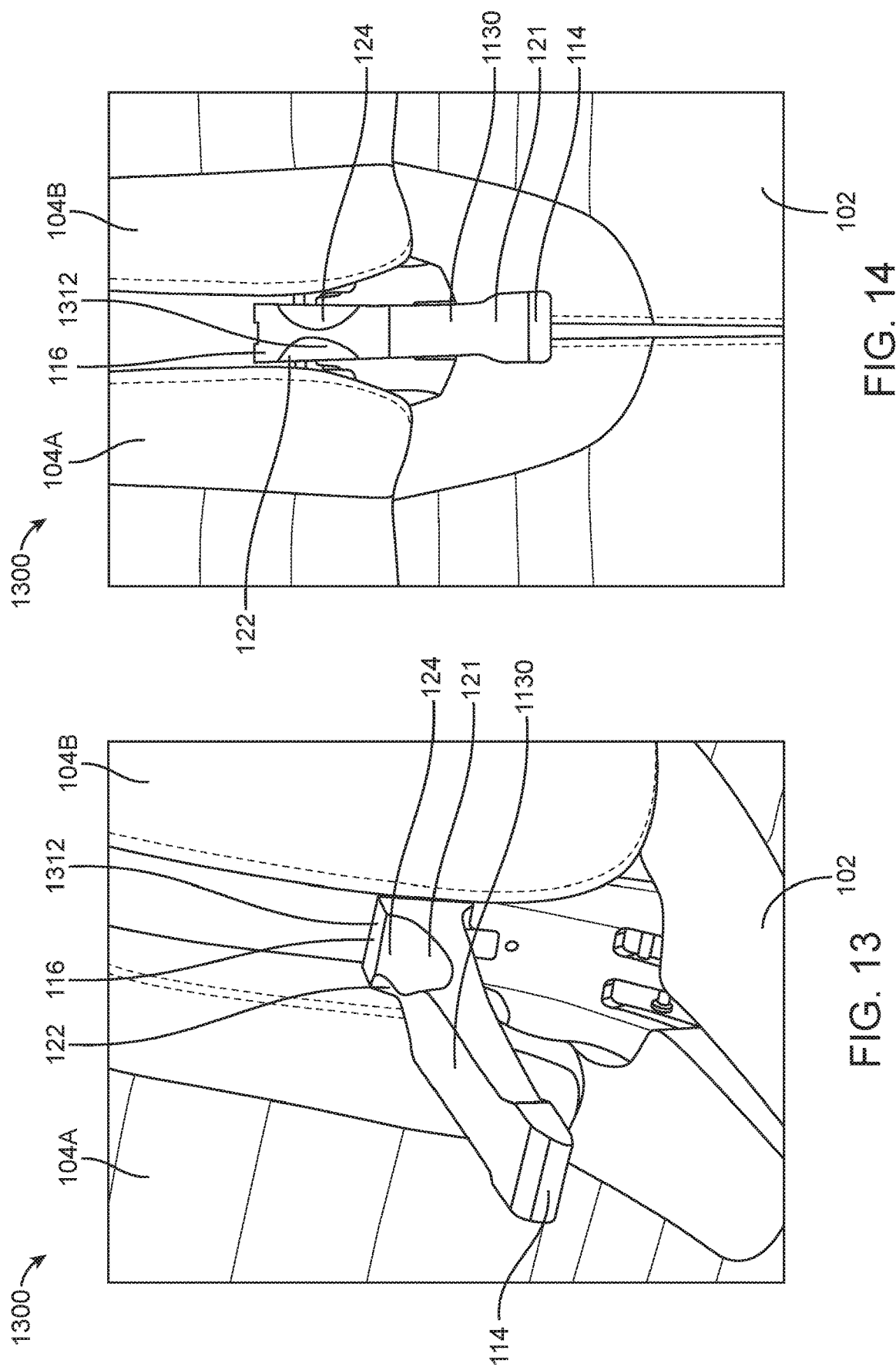

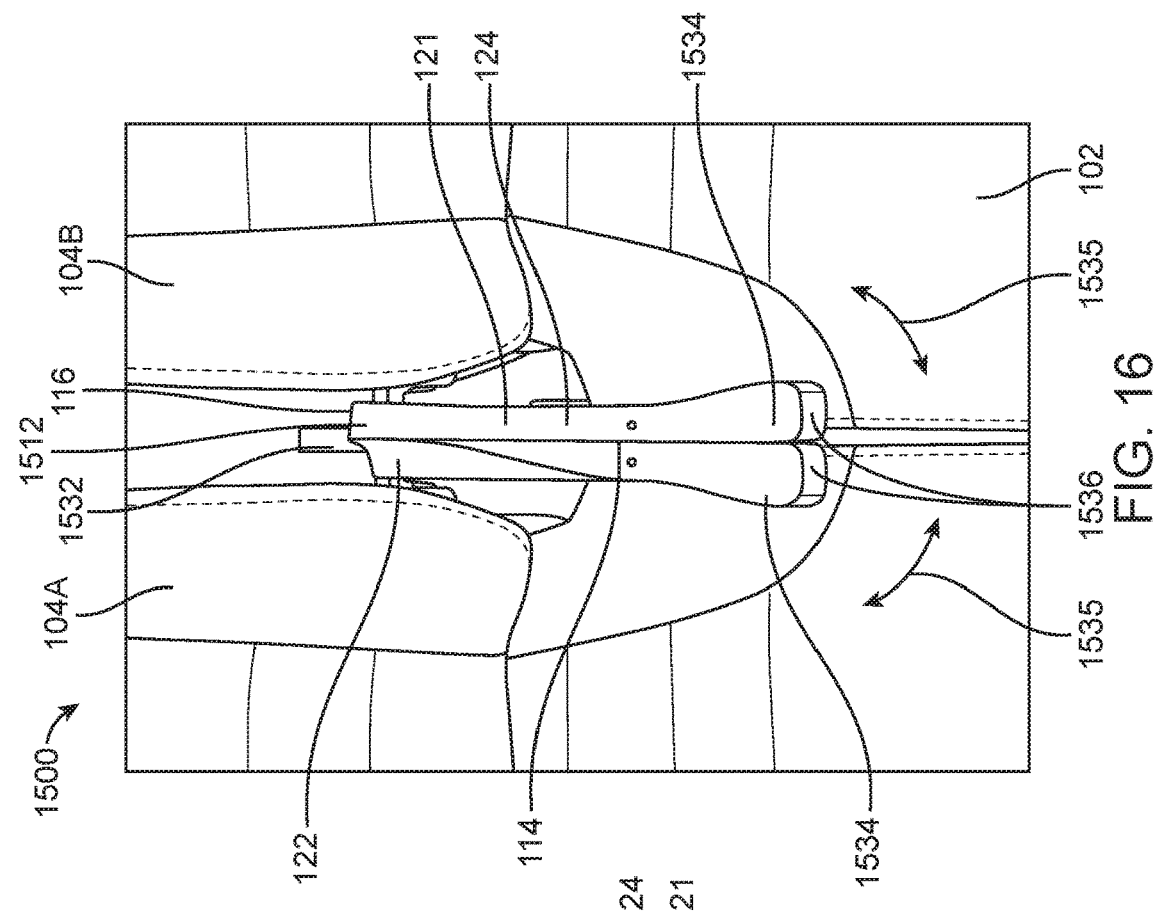
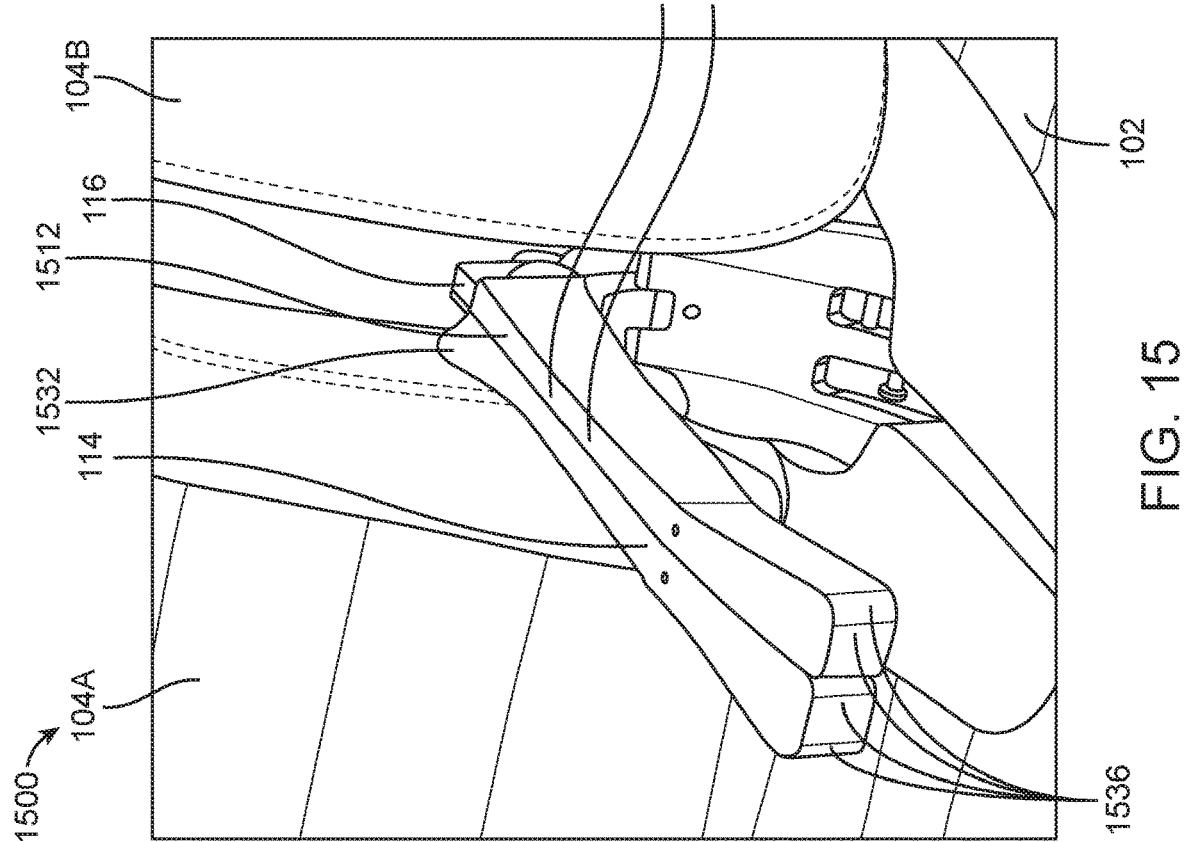

PASSENGER SEAT ARMREST WITH A MULTI-ZONE TOP SURFACE

REFERENCE TO RELATED APPLICATION

The application claims the benefit of U.S. Provisional Application No. 62/925,864, filed on Oct. 25, 2019 and entitled PASSENGER SEAT ARMREST WITH A MULTI-ZONE TOP SURFACE, the content of which is hereby incorporated by reference in its entirety.

FIELD OF THE INVENTION

The field of the invention relates to passenger seats, and, more particularly, to an armrest for a passenger seat.

BACKGROUND

Passenger vehicles, such as aircraft, buses, trains, ships, and automobiles, include passenger seats for passengers to sit in and utilize during travel. Sometimes, passenger seats are provided such that one passenger is seated next to another passenger, and an armrest is provided between the passengers. In such situations with a shared armrest, the two passengers are either forced to share the armrest surface or one passenger uses the entirety of the armrest surface while the other passenger cannot use the armrest. It is common for both scenarios to cause tension between the passengers due to the impact on the passenger's living space. There have been some proposals to solve the issue of the shared armrest such attaching a divider onto the armrest, but such solutions are generally complex, add weight to the passenger seats, and have issues complying with various certifications (e.g., passenger seat certifications for aircraft).

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an armrest for a passenger seat includes a forward end, an aft end opposite from the forward end, and a top surface extending from the forward end to the aft end. The top surface includes a first zone and a second zone, and the first zone of the top surface includes a concave curvature.

In some embodiments, at least a portion of the second zone is between the first zone and the forward end of the armrest. In various examples, the second zone of the top surface is proximate to the forward end of the armrest, and a width of the second zone of the top surface at the forward end is greater than a width of the first zone of the top surface.

In certain aspects, the second zone of the top surface is planar. In some examples, the second zone of the top surface includes a concave curvature, and wherein the concave curvature of the first zone of the top surface is different from the concave curvature of the second zone of the top surface.

In various examples, the armrest also includes a first side extending between the forward end and the aft end and a second side opposite from the first side and extending between the forward end and the aft end. In certain cases, the first zone of the top surface has the concave curvature in a direction extending between the forward end and the aft end and in a direction extending between the first side and the second side. In some embodiments, the armrest also includes at least one forearm support pivotably coupled to the forward end of the armrest.

According to certain embodiments of the present invention, an armrest for a passenger seat includes a forward end, an aft end opposite from the forward end, and a top surface extending from the forward end to the aft end. The top surface includes a first zone and a second zone, and a curvature of the first zone of the top surface is different from a curvature of the second zone of the top surface.

In various embodiments, at least a portion of the second zone of the top surface is between the first zone of the top surface and the forward end of the armrest. In certain cases, the first zone of the top surface includes a concave curvature and the second zone of the top surface is planar. In some examples, the second zone of the top surface is proximate to the forward end of the armrest, and a width of the second zone of the top surface at the forward end is greater than a width of the first zone of the top surface.

In some examples, the armrest further includes a first side extending between the forward end and the aft end and a second side opposite from the first side and extending between the forward end and the aft end. In certain aspects, the first zone of the top surface includes a concave curvature in a direction extending between the forward end and the aft end and in a direction extending between the first side and the second side. The top surface of the armrest may include a third zone, and a curvature of the third zone of the top surface may be different from the curvature of the first zone of the top surface and different from the curvature of the second zone of the top surface.

According to certain embodiments of the present invention, an armrest for a passenger seat includes a first side and a second side opposite from the first side. The first side and the second side define a length of the armrest, and the length is greater than a width of the armrest. The armrest also includes a top surface extending between the first side and the second side. The top surface includes a first zone between the first side and the second side and a second zone between the first zone and the second side, and a curvature of the first zone of the top surface is different from a curvature of the second zone of the top surface.

In some embodiments, the first zone of the top surface is planar and the second zone of the top surface includes a concave curvature. In various embodiments, the first zone of the top surface includes a concave curvature and the second zone of the top surface includes a concave curvature. In certain examples, the armrest includes a forward end and an aft end opposite from the forward end, the first side and the second side extend between the forward end and the aft end, and at least a portion of the first zone of the top surface is between the second zone of the top surface and the forward end. In various aspects, a width of the second zone of the top surface at the forward end is greater than a width of the first zone of the top surface. In some cases, the armrest includes at least one forearm support pivotably coupled to the forward end of the armrest. In various embodiments, the second zone of the top surface includes a concave curvature in a direction extending between the forward end and the aft end and in a direction extending between the first side and the second side.

BRIEF DESCRIPTION OF THE DRAWINGS

FIG. 13 is a perspective view of an armrest with a multi-zone top surface according to certain embodiments of the present invention.

FIG. 14 is another perspective view of the armrest of FIG. 13.

FIG. 15 is a perspective view of an armrest with a multi-zone top surface according to certain embodiments of the present invention.

FIG. 16 is another perspective view of the armrest of FIG. 15.

DETAILED DESCRIPTION

Figure 1:
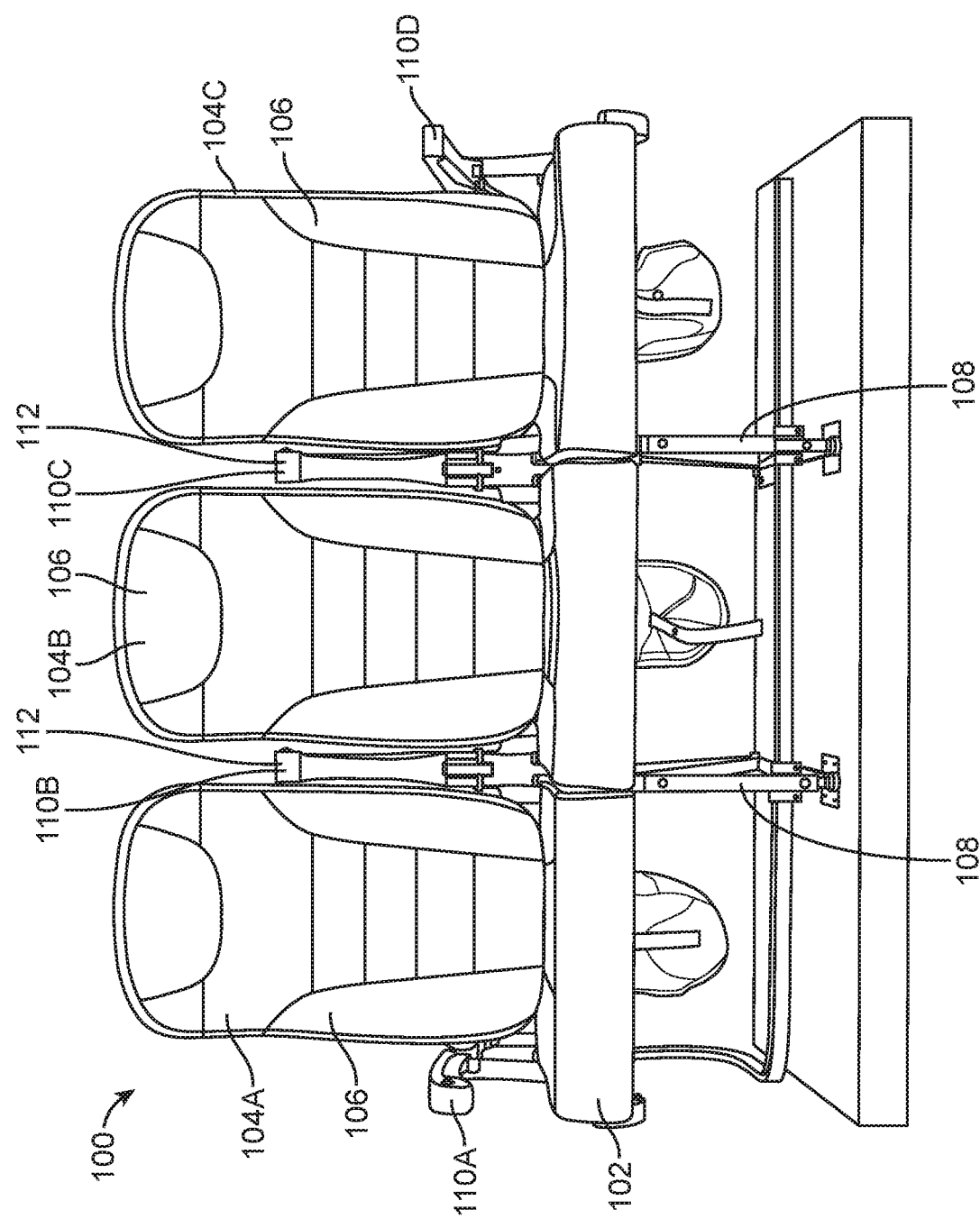
FIG. 1 is a front view a passenger seat arrangement according to certain embodiments of the present invention, the passenger seat arrangement including an armrest with a multi-zone top surface.
Figure 2:
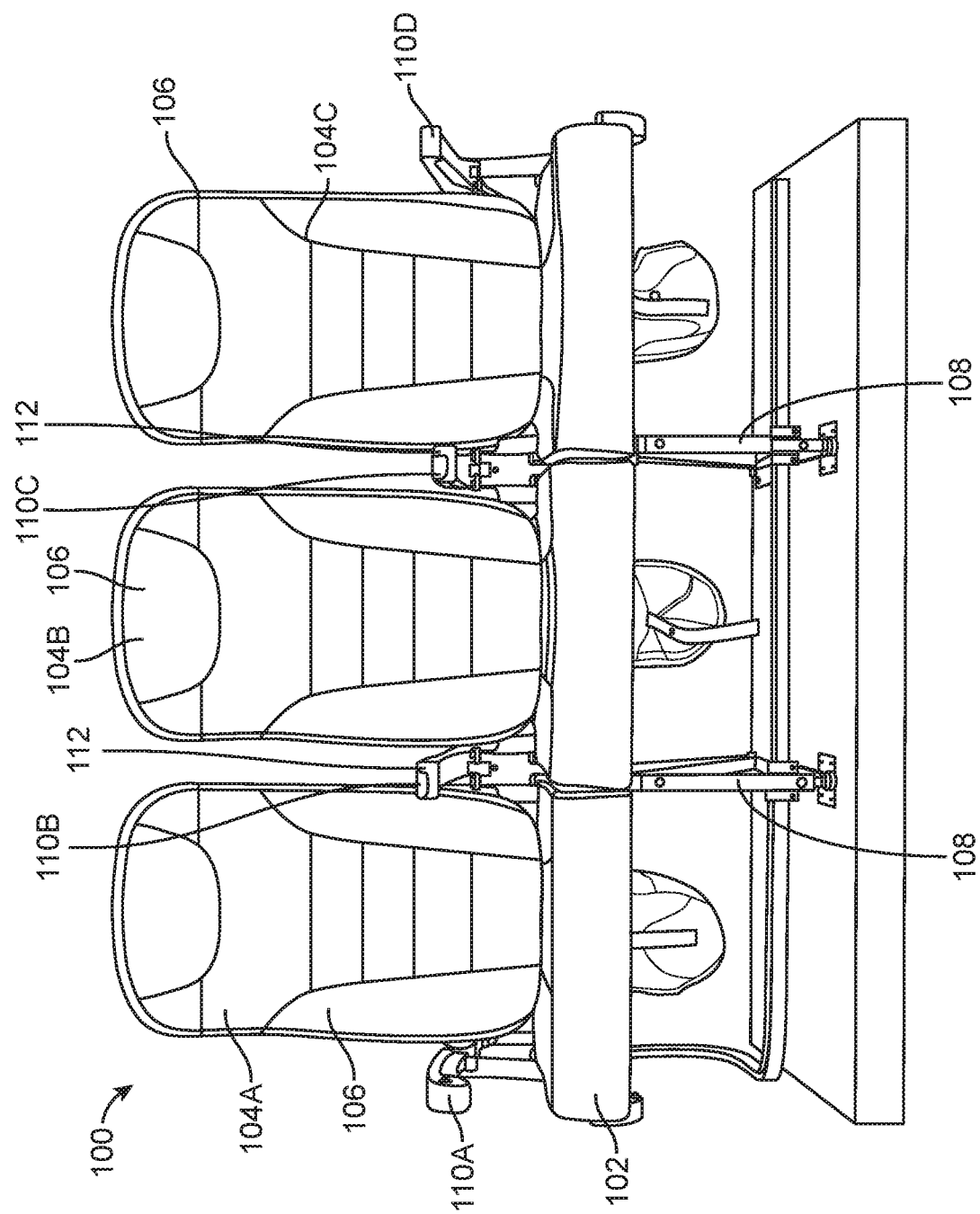
FIG. 2 is another front view of the passenger seat arrangement of FIG. 1.
Figure 4:
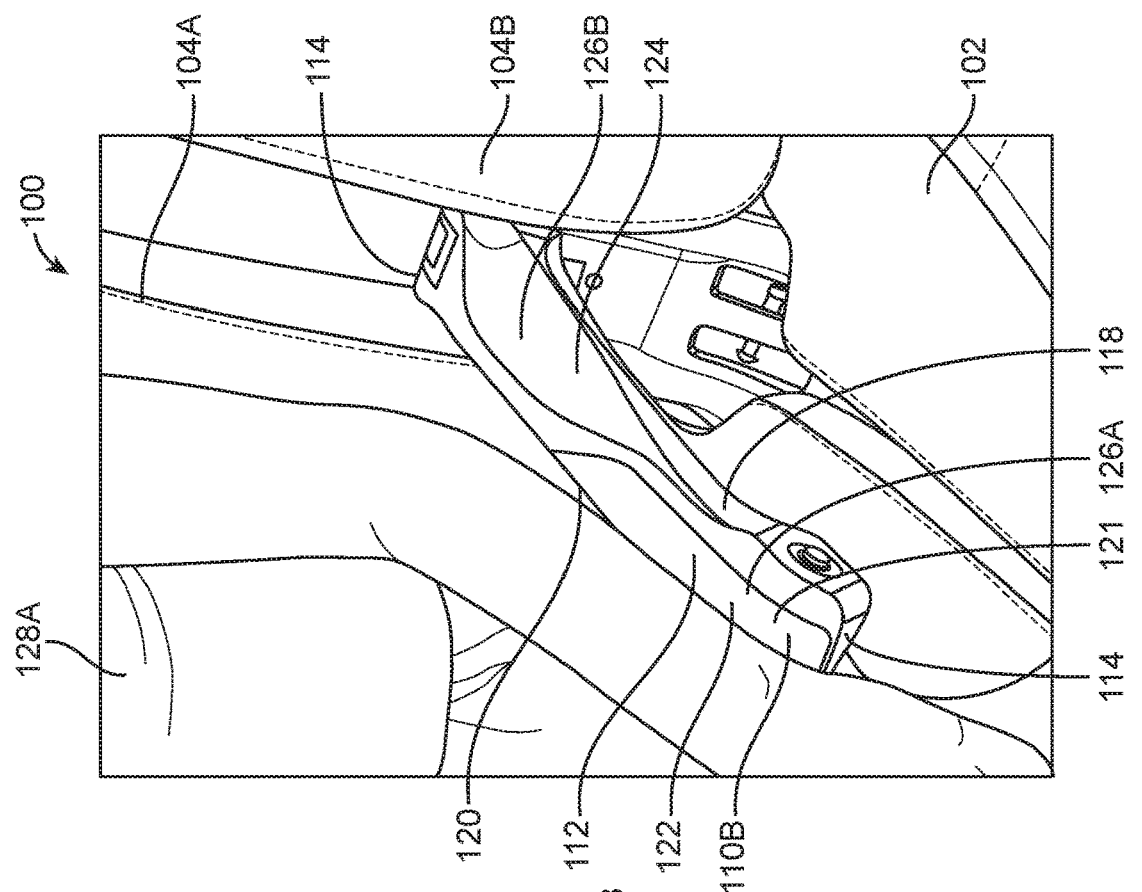
FIG. 4 is another perspective view of the armrest of FIG. 1 with the multi-zone top surface.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide multi-zone armrests for passenger seats. While the multi-zone armrests are discussed for use with aircraft seats, they are by no means so limited. Rather, embodiments of the multi-zone armrests may be used in passenger seats or other seats of any type or otherwise as desired. Each multi-zone armrest has a top surface, and the top surface has at least two zones. In various aspects, the top surface of the multi-zone armrest may include more than two zones, such as three zones, four zones, etc. In certain embodiments, the curvature of the top surface in one of the zones is different from the curvature of the top surface in another one of the zones. In some embodiments, at least one of the zones of the top surface of the multi-zone armrest has a concave curvature. In various non-limiting examples, the concave curvature of the at least one zone may conform to anthropometric dimensions of portions of a passengers arm (e.g., elbow, forearm, etc.). In certain aspects, the multi-zone armrest visually and physically divides the top surface of the armrest such that passengers sharing the armrest understand the limits of their personal space.

FIGS. 1-6 illustrate an example of a passenger seat assembly 100 according to certain embodiments of the present disclosure. The passenger seat assembly 100 includes a base 102 and at least one backrest 104. In the example of FIGS. 1-6, the passenger seat assembly 100 is capable of carrying a quantity of three passengers, and accordingly has three backrests 104A-C. It will be appreciated that in various other examples, the passenger seat assembly 100 can be capable of carrying any desired number of passengers, such as one passenger, two passengers, three passengers, four passengers, or any other desired number of passengers. In these examples, the passenger seat assembly 100 can likewise have any desired number of corresponding backrests 104. Each backrest 104 has a forward-facing side 106 and an aft-facing side (not visible in FIGS. 1-6) opposite from the forward-facing side 106. When used by the passenger, the forward-facing side 106 is a side against which a passenger may rest his or her back. In some cases, each backrest 104 may be pivotably connected to the base 102 such that a passenger can be in various positions such as a reclined position, upright position, etc. The base 102 may include legs 108 or other suitable supports to support the passenger seat assembly 100 on a surface, such as a surface of a passenger vehicle.

Armrests 110 may also be provided with the passenger seat assembly 100. In the example of FIGS. 1-6, four armrests 110A-D are provided, although it will be appreciated that any number of armrests could be utilized as desired. In some cases, one or more armrests may be movable between a stowed configuration (see, e.g., armrests 110B and 110C in FIG. 1) and a deployed position (see, e.g., armrests 110B and 110C in FIG. 2). In some cases, in the stowed configuration, the armrests may be at least partially within a gap defined between adjacent backrests 104. In the deployed position, some of the armrests (e.g., armrests 110B and 110C) may be shared by passengers sitting in adjacent seats, and the armrests may separate the living space of one passenger from the living space of an adjacent passenger.

In some cases, at least one of the armrests 110 may be a multi-zone armrest 112. In the example of FIGS. 1-6, the armrests 110B and 110C are multi-zone armrests 112. As best illustrated in FIGS. 3-6, the multi-zone armrest 112 includes a forward end 114, an aft end 116 opposite from the forward end 114, a first side 118 extending between the forward end 114 and the aft end 116, and a second side 120 opposite from the first side 118 and extending between the forward end 114 and the aft end 116. In some cases, the aft end 116 is the portion of the armrest 110 that is pivotably connected to the passenger seat assembly 100 such that the multi-zone armrest 112 is movable between the stowed position and the deployed position. A top surface 121 extends between the forward end 114, the aft end 116, the first side 118, and the second side 120, and is generally the surface that the passenger may rest a portion of his or her arm on when the armrest is in the deployed position. A distance from the forward end 114 to the aft end 116 is a length of the multi-zone armrest 112, and a distance from the first side 118 to the second side 120 is a width of the multi-zone armrest 112.

Figure 3:
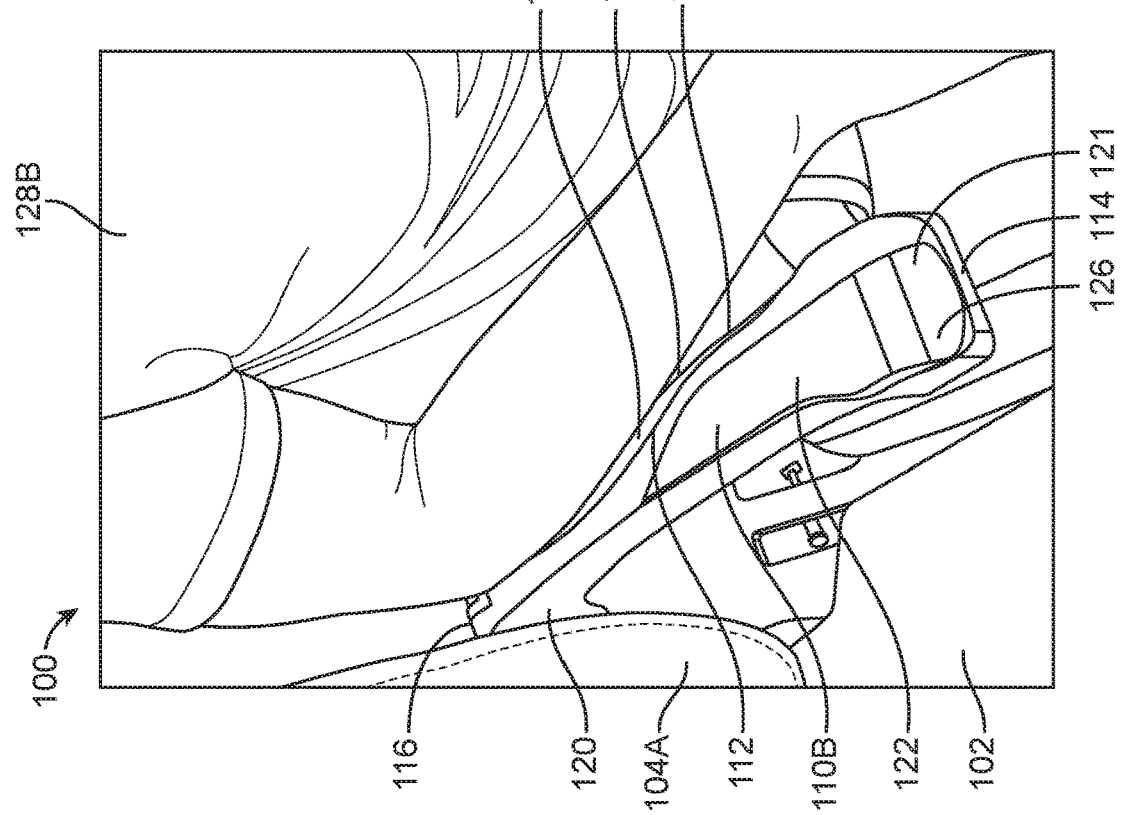
FIG. 3 is a perspective view of the armrest of FIG. 1 with the multi-zone top surface.

In some optional examples, and as best illustrated in FIG. 3, the portion of the top surface 121 that is proximate to the forward end 114 may have a width that is greater than other portions of the multi-zone armrest 112, although it need not in other examples. In some cases and when included, the increased width of the top surface 121 proximate to the forward end 114 may increase the amount of the top surface 121 that is usable by a particular passenger. In various examples, a maximum width of the portion of the top surface 121 proximate to the forward end 114 is less than a distance between adjacent backrests 104 of the passenger seat assembly 100.

The top surface 121 of the multi-zone armrest 112 includes a first zone 122 and a second zone 124. In other examples, the top surface 121 may include additional zones such that the top surface 121 has more than two zones. In various aspects, the first zone 122 is the part of the top surface 121 configured to accommodate one passenger, and the second zone 124 is the part of the top surface 121 configured to accommodate an adjacent passenger sharing the multi-zone armrest 112. The particular locations, shapes or profiles, and sizes of the first zone 122 and the second zone 124 should not be considered limiting on the current disclosure. As one non-limiting example, the first zone 122 may be proximate to the forward end 114 and the second zone 124 may be proximate to the aft end 116 or vice versa. As another non-limiting example, at least a portion of the first zone 122 may be between the second zone 124 and the forward end 114 and at least a portion of the second zone 124 may be between the first zone 122 and the aft end 116 or vice versa. As a further non-limiting example, the first zone 122 may be between the first side 118 and the second side 120 and the second zone 124 may be between the first zone 122 and the second side 120 or vice versa.

In various examples, the curvature of the top surface 121 in the first zone 122 is different from the curvature of the top surface 121 in the second zone 124. As some non-limiting examples, the first zone 122 and/or the second zone 124 may be planar, have a concave curvature, have a convex curvature, or any other surface curvature as desired. As such, the curvature of the first zone 122 and the second zone 124 illustrated in the figures should not be considered limiting on the current disclosure. When the top surface 121 includes more than two zones, the curvature of the additional zones may be different from or the same as the curvature of the first zone 122 and/or the curvature of the second zone 124 (see, e.g., FIGS. 11-16).

In some examples, at least one of the first zone 122 or the second zone 124 may have a concave curvature. In certain aspects, the zone proximate to the aft end 116 may have a concave curvature, although that need not always be the case. In certain examples, the first zone 122 may have a first concave curvature and the second zone 124 may have a second concave curvature that is different from the first concave curvature. In some embodiments, the concavity of the first zone 122 and/or the second zone 124 may be complimentary to an anthropometric dimension of a portion of a passenger's arm, such as an elbow, a forearm, etc. In various embodiments, the curvature of the first zone 122 and/or the second zone 124 may have a concavity in the length direction, the width direction, or both the length direction and the width direction of the multi-zone armrest 112. In some examples, the different curvatures of the first zone 122 and the second zone 124 may optionally provide a physical indication, such as physical discomfort or physical comfort, when the wrong passenger is using a particular zone of the top surface 121 and/or when the correct passenger is using a particular zone of the top surface 121. In some cases, the first zone 122 and the second zone 124 may have visual or tactile features to differentiate the zones 122, 124 and provide a visual indication and/or physical indication to the passengers about the different zones.

In the example of FIGS. 1-6, the first zone 122 has a planar curvature, is at the forward end 114 and is between the second zone 124 and the forward end 114, and at least a portion of the first zone 122 is between the second zone 124 and the second side 120. The second zone 124 has a concave curvature, is at the aft end 116 and is between the first zone 122 and the aft end 116, and at least a portion of the second zone 124 is between the first zone 122 and the first side 118. As best illustrated in FIG. 3, in this embodiment, the width of the first zone 122 at the forward end 114 is greater than a width of the second zone 124. In these examples, the first zone 122 has a first visual indicator 126A and the second zone 124 has a second visual indicator that is different from the first visual indicator 126B. In FIGS. 3-6, the multi-zone armrest 112 illustrated is the armrest 110B, and the first zone 122 is configured to be used by a first passenger 128A utilizing the backrest 104A and the second zone 124 is configured to be used by a second passenger 128B utilizing the backrest 104B.

Figure 6:
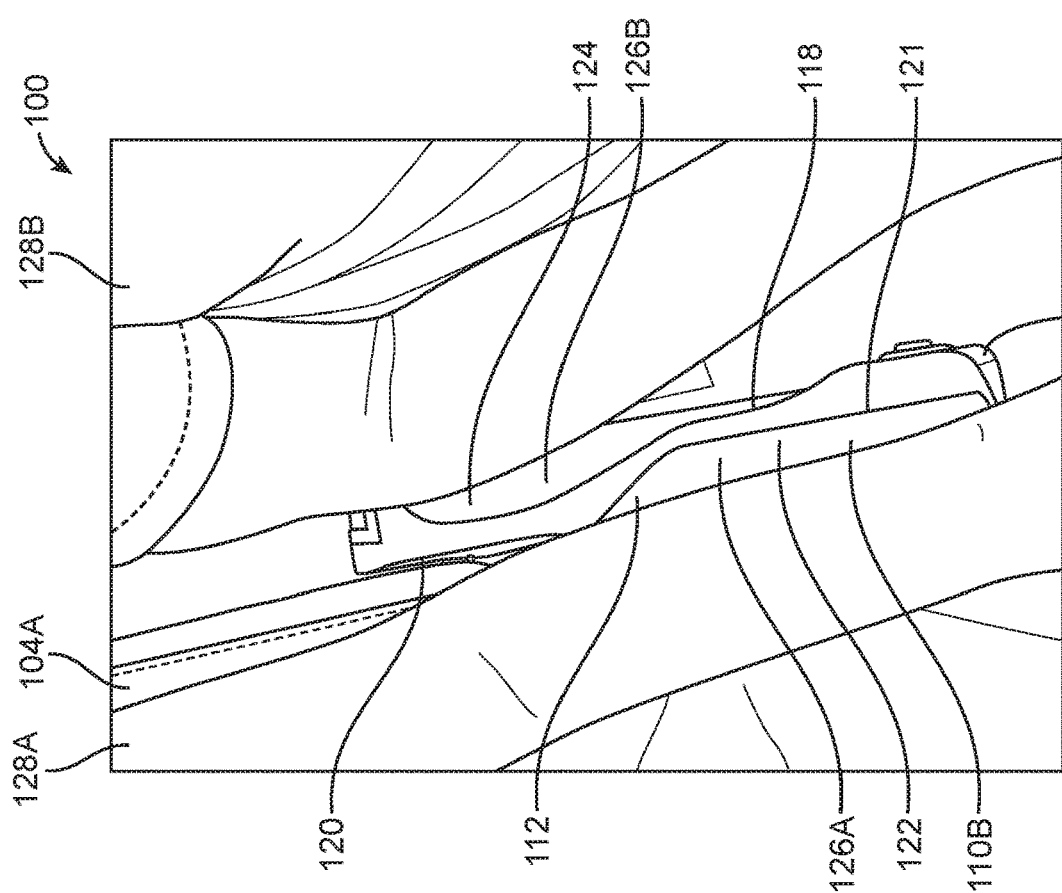
FIG. 6 is another perspective view of the armrest of FIG. 1 with the multi-zone top surface.
Figure 5:
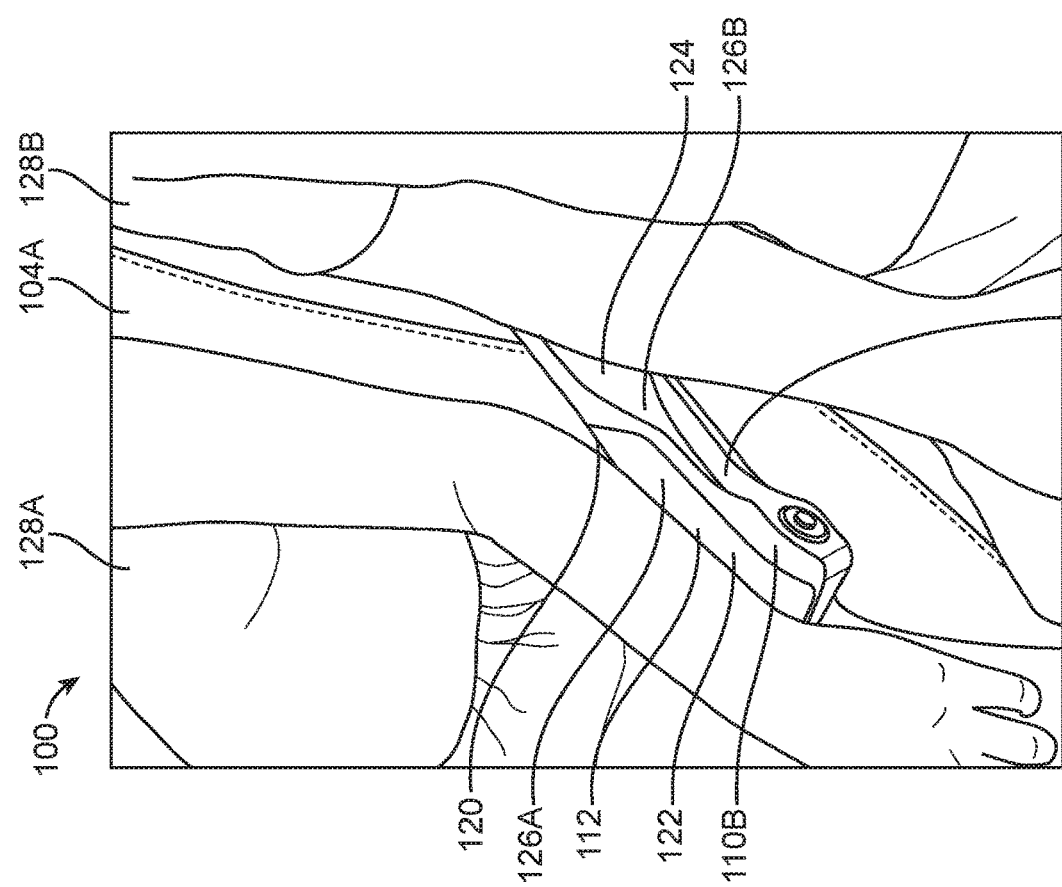
FIG. 5 is another perspective view of the armrest of FIG. 1 with the multi-zone top surface.
Figure 7:
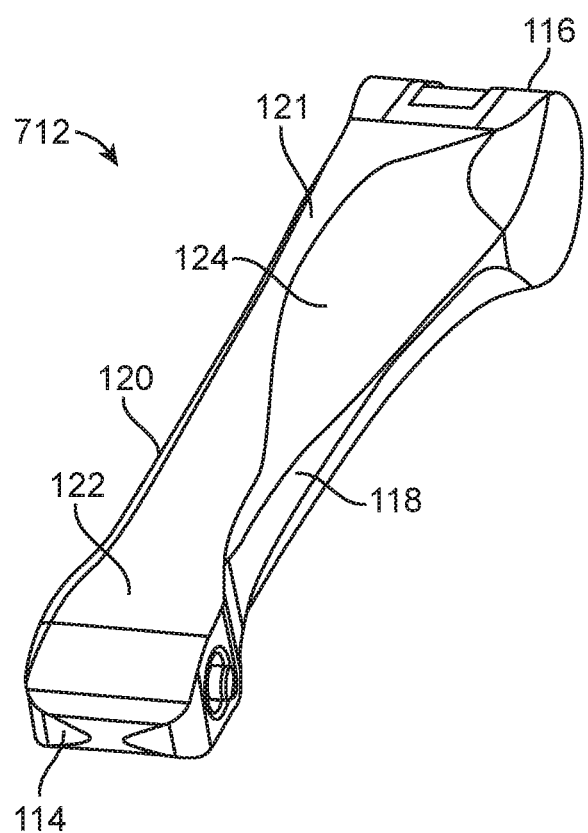
FIG. 7 is a perspective view of an armrest with a multi-zone top surface according to certain embodiments of the present invention.
Figure 8:
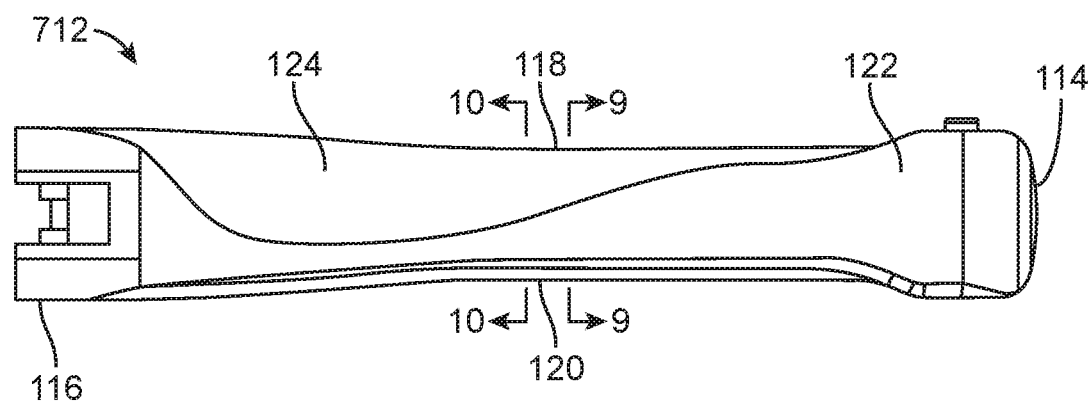
FIG. 8 is a top view of the armrest of FIG. 7.
Figure 9:
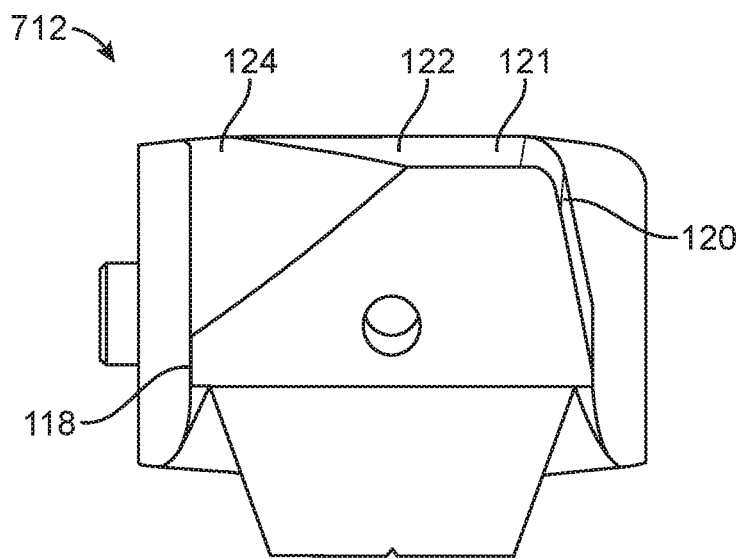
FIG. 9 is a sectional view of the armrest of FIG. 7 taken along line 9-9 in FIG. 8.
Figure 10:
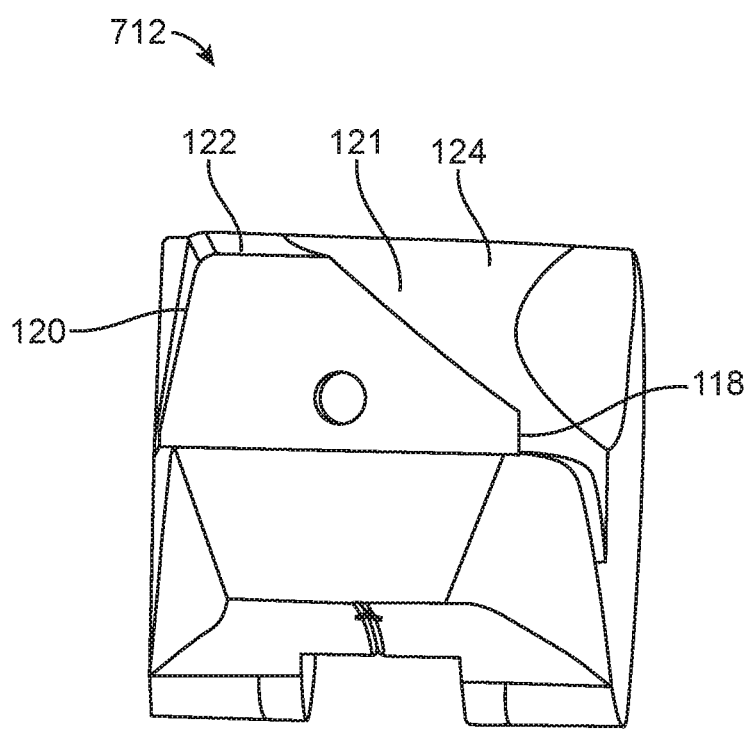
FIG. 10 is a sectional view of the armrest of FIG. 7 taken along line 10-10 in FIG. 8.

As illustrated in FIGS. 5 and 6, in various aspect, the multi-zone armrest 112 with top surface 121 having the first zone 122 and the second zone 124 with different curvatures may allow for the passengers to have predefined living spaces on the shared armrest. The multi-zone armrest 112 may also allow for passengers in adjacent seats to share the armrest by taking advantage of existing armrest space and without requiring additional materials or dividers that may otherwise cause complications or require additional certifications in certain industries such as the aviation industry.

FIGS. 7-10 illustrate another example of a multi-zone armrest 712 according to embodiments of the present disclosure. The multi-zone armrest 712 is substantially similar to the multi-zone armrest 112 and includes the first zone 122 and the second zone 124. Compared to the first zone 122 of the multi-zone armrest 112, the first zone 122 of the multi-zone armrest 712 extends from the forward end 114 to the aft end 116. In this example, a portion of the first zone 122 is between the second zone 124 and the forward end 114 and between the second zone 124 and the aft end 116. Similar to the first zone 122 of the multi-zone armrest 112, the first zone 122 of the multi-zone armrest 712 has a planar curvature, but a shape of the first zone 122 of the multi-zone armrest 712 is different from the shape of the multi-zone armrest 112. Compared to the second zone 124 of the multi-zone armrest 112, the second zone 124 of the multi-zone armrest 712 has a different shape and different concave curvature.

Figure 12:
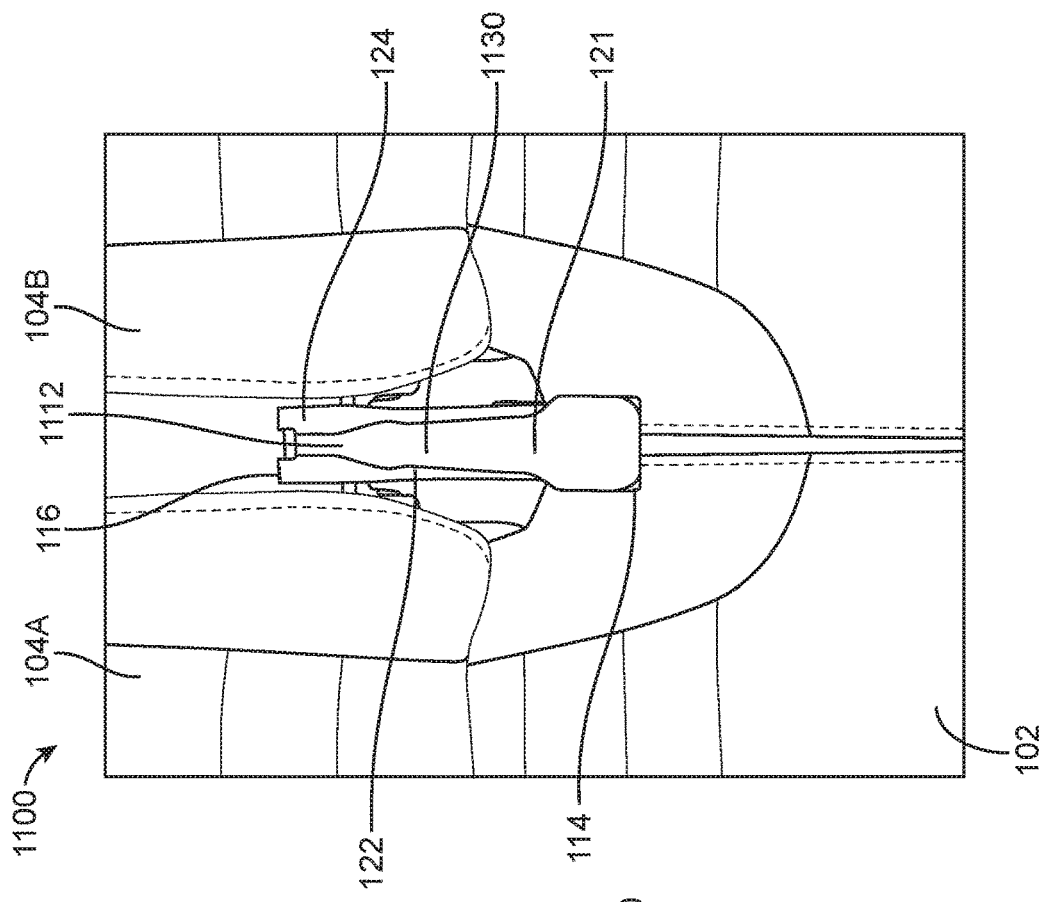
FIG. 12 is another perspective view of the armrest of FIG. 11.
Figure 11:
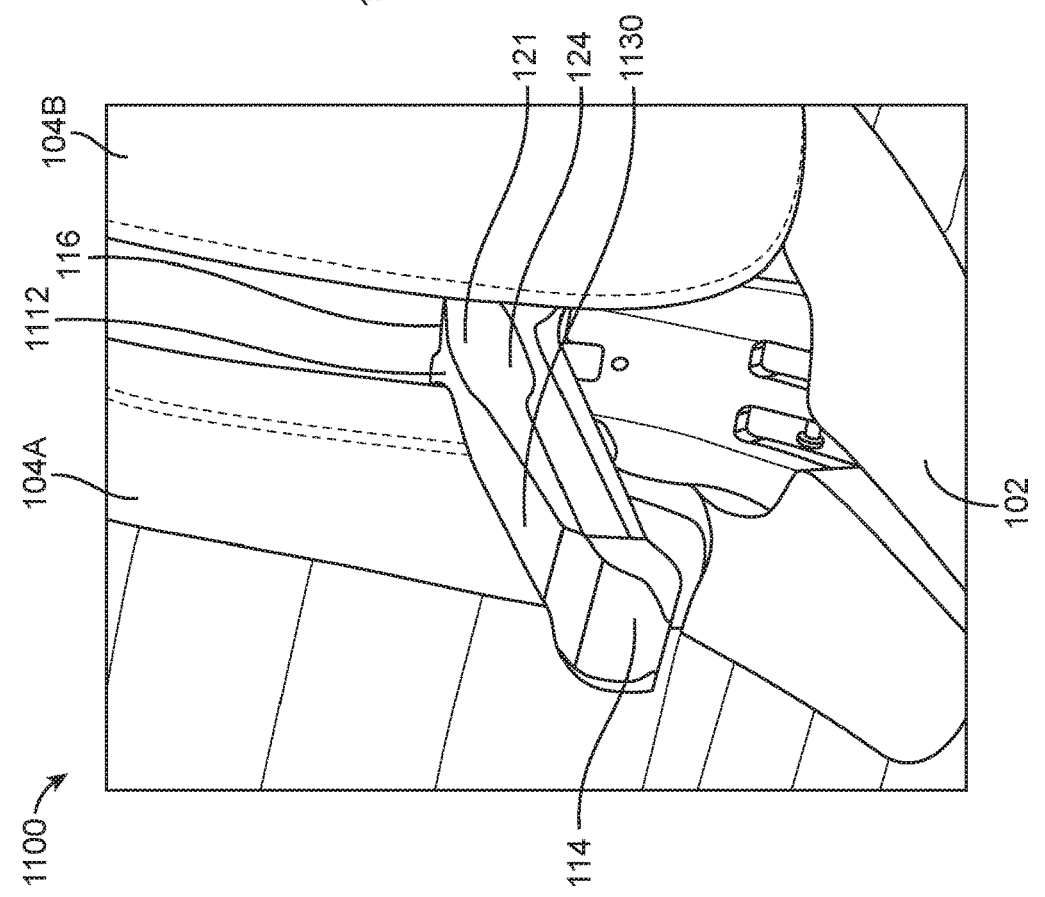
FIG. 11 is a perspective view of an armrest with a multi-zone top surface according to certain embodiments of the present invention.

FIGS. 11 and 12 illustrate another example of a passenger seat assembly 1100 according to embodiments of the present disclosure that includes a multi-zone armrest 1112. The multi-zone armrest 1112 is substantially similar to the multi-zone armrest 112 and includes the first zone 122 and the second zone 124. Compared to the multi-zone armrest 112, the first zone 122 and the second zone 124 of the multi-zone armrest 1112 both have a concave curvature. The top surface 121 of the multi-zone armrest 1112 also includes a third zone 1130 that extends from the forward end 114 to the aft end 116. In these examples, the third zone 1130 has a planar curvature, although it could have other curvatures in other examples. In various examples, a portion of the third zone 1130 is between the zones 122, 124 and the forward end 114, a portion of the third zone 1130 is between the zones 122, 124 and the aft end 116, and a portion of the third zone 1130 is between the first zone 122 and the second zone 124.

FIGS. 13 and 14 illustrate another example of a passenger seat assembly 1300 that includes a multi-zone armrest 1312 according to embodiments of the present disclosure. The multi-zone armrest 1312 is substantially similar to the multi-zone armrest 1112 and includes the first zone 122 and the second zone 124, and both the first zone 122 and the second zone 124 of the multi-zone armrest 1312 have a concave curvature. However, compared to the multi-zone armrest 1112, the concavity of the first zone 122 and the second zone 124 of the multi-zone armrest 1312 is different. The top surface 121 of the multi-zone armrest 1312 also includes the third zone 1130 that extends from the forward end 114 to the aft end 116. In these examples, the third zone 1130 has a planar curvature, although the shape of the third zone 1130 of the multi-zone armrest 1312 is different from the shape of the third zone 1130 of the multi-zone armrest 1112. In the example of FIGS. 13 and 14, a portion of the third zone 1130 is between the zones 122, 124 and the forward end 114, a portion of the third zone 1130 is between the zones 122, 124 and the aft end 116, and a portion of the third zone 1130 is between the first zone 122 and the second zone 124.

FIGS. 15 and 16 illustrate another example of a passenger seat assembly 1500 with a multi-zone armrest 1512 according to embodiments of the present disclosure. The multi-zone armrest 1512 is substantially similar to the multi-zone armrest 112 and includes the first zone 122 and the second zone 124. In the multi-zone armrest 1512, the first zone 122 of the multi-zone armrest 1512 has a concave curvature and the second zone 124 has a planar curvature. In this example, both the first zone 122 and the second zone 124 are at the aft end 116, and a portion of the second zone 124 is between the first zone 122 and the forward end 114. As best illustrated in FIGS. 15 and 16, a ridge 1532 is optionally defined at a boundary between the first zone 122 and the second zone 124 proximate to the aft end 116. When included, the ridge 1532 may provide a physical indication of the boundary between the two zones 122, 124 when passengers use the multi-zone armrest 1512. It will be appreciated that the ridge 1532 may extend along various lengths of the boundary between adjacent zones of the top surface 121 as desired.

The multi-zone armrest 1512 also includes two forearm supports 1534 that may selectively support portions of a passenger's arms. In various aspects, each forearm support 1534 is pivotably attached to the multi-zone armrest 1512. In some cases, the forearm supports 1534 are pivotably attached to the forward end 114, although they may be attached at other locations in various other embodiments. The forearm supports 1534 are movable (represented by arrows 1535 in FIG. 16) between a stowed position (FIG. 16) and a deployed position. As illustrated in FIG. 16, in the stowed position, the forearm supports 1534 are positioned adjacent to one another and optionally in contact with each other. In the deployed position, forward ends 1536 of the forearm supports 1534 are spaced apart from each other. In various examples, the forearm supports 1534 may be independently movable relative to the multi-zone armrest 1512, although they need not be. In some cases, the forearm supports 1534 may optionally be biased toward the stowed position such that a default position of the forearm supports 1534 is the stowed position when not in use. The shape of the forearm supports 1534 should not be considered limiting on the current disclosure, as the forearm supports 1534 may have various suitable shapes as desired to support various portions of a passenger's arm. It will further be appreciated that the forearm supports 1534 may be provided in armrests 110 does not have a multi-zone top surface 121.

Figure 17:
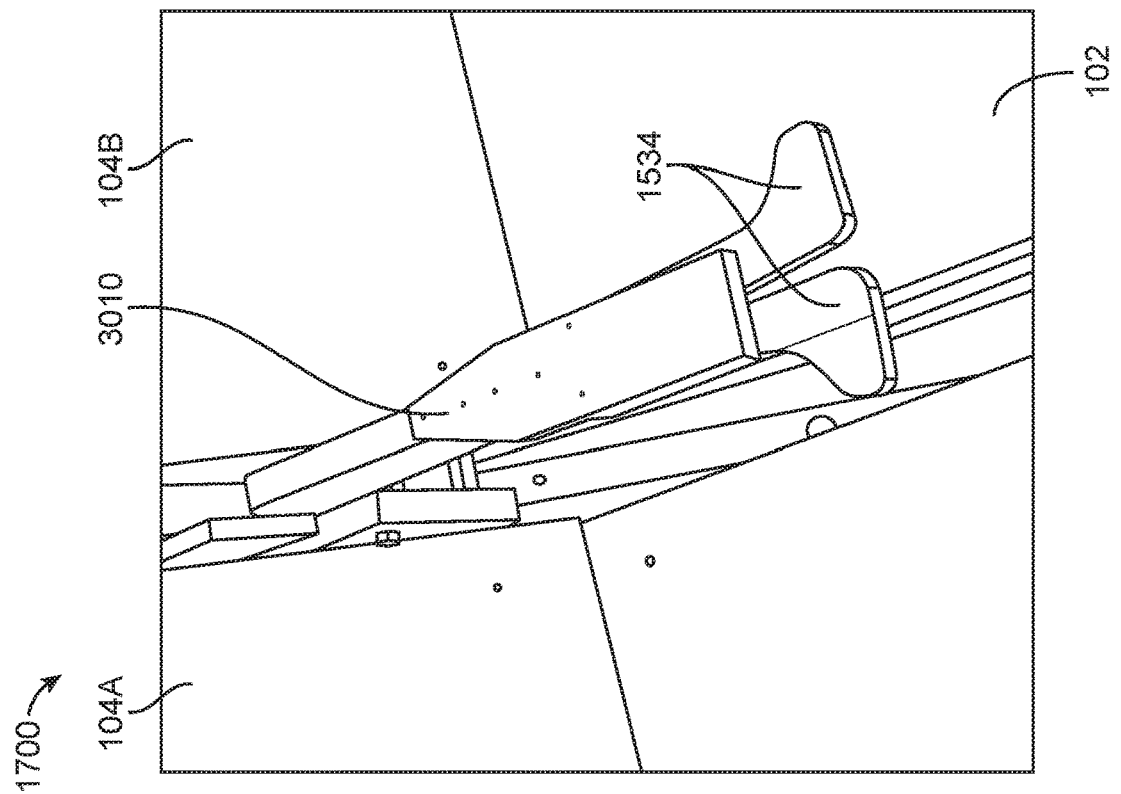
FIG. 17 is a perspective view of an armrest with a pivotable forearm support according to certain embodiments of the present invention.

FIG. 17 illustrates an example of a passenger seat assembly 1700 with an armrest 1710 according to aspects of the current disclosure that does not have a multi-zone top surface 121 but includes the forearm supports 1534. Compared to the forearm supports 1534 of FIGS. 15 and 16, the forearm supports 1534 of the armrest 1710 have a different shape and are attached to an underside of the armrest 1710.

Figure 18:
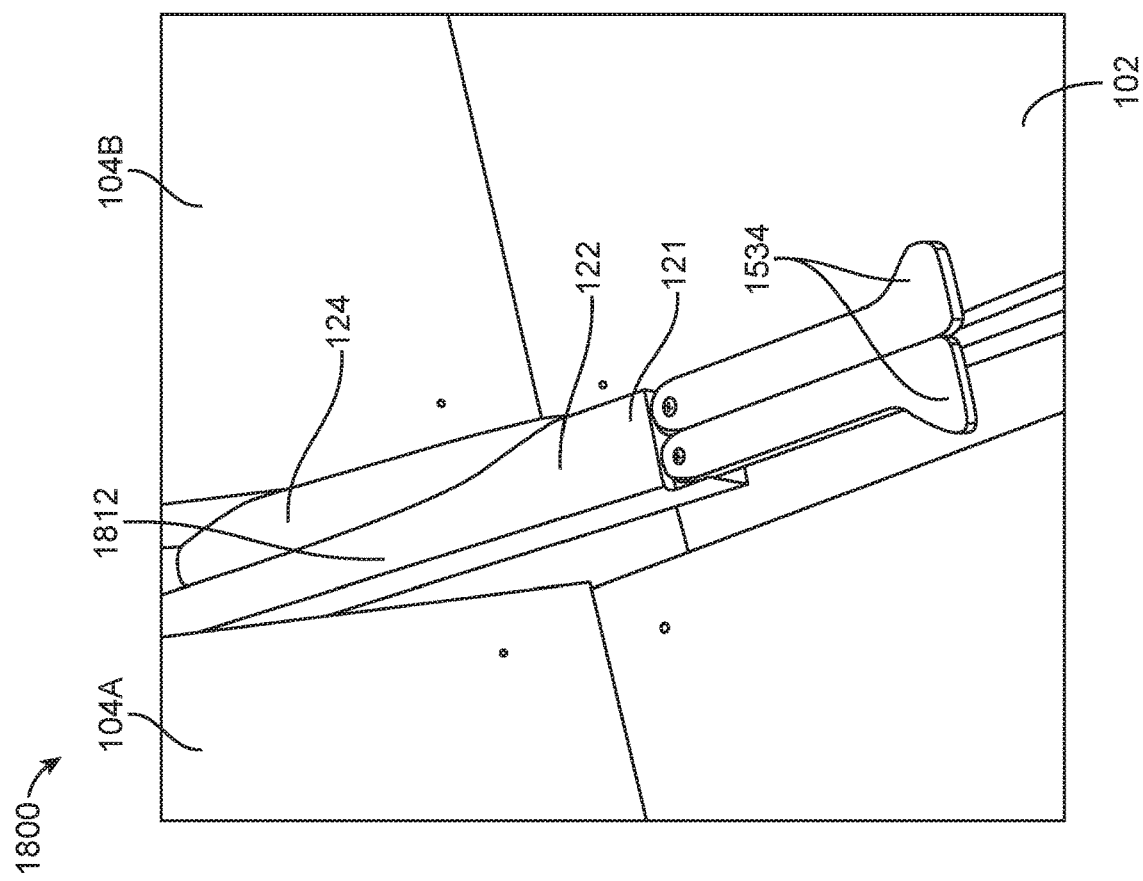
FIG. 18 is a perspective view of an armrest with a pivotable forearm support according to certain embodiments of the present invention.

FIG. 18 illustrates an example of a passenger seat assembly 1800 with a multi-zone armrest 1812 according to aspects of the current disclosure that includes the first zone 122, the second zone 124, and the forearm supports 1534. In this example, the first zone 122 has a planar curvature and the second zone 124 has a concave curvature. Compared to the forearm supports 1534 of FIGS. 15 and 16, the forearm supports 1534 of the multi-zone armrest 1812 have a different shape and are attached to the top surface 121 of the multi-zone armrest 1812.

A collection of exemplary embodiments, including at least some explicitly enumerated as "Examples," providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

Example 1. An armrest for a passenger seat, the armrest comprising: a forward end; an aft end opposite from the forward end; and a top surface extending from the forward end to the aft end, wherein the top surface comprises a first zone and a second zone, and wherein the first zone of the top surface comprises a concave curvature.

Example 2. The armrest of any preceding or subsequent examples or combination of examples, wherein at least a portion of the second zone is between the first zone and the forward end of the armrest.

Example 3. The armrest of any preceding or subsequent examples or combination of examples, wherein the second zone of the top surface is proximate to the forward end of the armrest, and wherein a width of the second zone of the top surface at the forward end is greater than a width of the first zone of the top surface.

Example 4. The armrest of any preceding or subsequent examples or combination of examples, wherein the second zone of the top surface is planar.

Example 5. The armrest of any preceding or subsequent examples or combination of examples, wherein the second zone of the top surface comprises a concave curvature, and wherein the concave curvature of the first zone of the top surface is different from the concave curvature of the second zone of the top surface.

Example 6. The armrest of any preceding or subsequent examples or combination of examples, wherein the armrest further comprises a first side extending between the forward end and the aft end and a second side opposite from the first side and extending between the forward end and the aft end, and wherein the first zone of the top surface has the concave curvature in a direction extending between the forward end and the aft end and in a direction extending between the first side and the second side.

Example 7. The armrest of any preceding or subsequent examples or combination of examples, wherein the armrest further comprises at least one forearm support pivotably coupled to the forward end of the armrest.

Example 8. A passenger seat assembly comprising: a base; at least one backrest; and at least one armrest according any preceding or subsequent examples or combination of examples.

Example 9. An armrest for a passenger seat, the armrest comprising: a forward end; an aft end opposite from the forward end; and a top surface extending from the forward end to the aft end, wherein the top surface comprises a first zone and a second zone, and wherein a curvature of the first zone of the top surface is different from a curvature of the second zone of the top surface.

Example 10. The armrest of any preceding or subsequent examples or combination of examples, wherein at least a portion of the second zone of the top surface is between the first zone of the top surface and the forward end of the armrest.

Example 11. The armrest of any preceding or subsequent examples or combination of examples, wherein the first zone of the top surface comprises a concave curvature and wherein the second zone of the top surface is planar.

Example 12. The armrest of any preceding or subsequent examples or combination of examples, wherein the second zone of the top surface is proximate to the forward end of the armrest, and wherein a width of the second zone of the top surface at the forward end is greater than a width of the first zone of the top surface.

Example 13. The armrest of any preceding or subsequent examples or combination of examples, wherein the armrest further comprises a first side extending between the forward end and the aft end and a second side opposite from the first side and extending between the forward end and the aft end, and wherein the first zone of the top surface comprises a concave curvature in a direction extending between the forward end and the aft end and in a direction extending between the first side and the second side.

Example 14. The armrest of any preceding or subsequent examples or combination of examples, wherein the top surface of the armrest further comprises a third zone, and wherein a curvature of the third zone of the top surface is different from the curvature of the first zone of the top surface and different from the curvature of the second zone of the top surface.

Example 15. A passenger seat assembly comprising: a base; at least one backrest; and at least one armrest according any preceding or subsequent examples or combination of examples.

Example 16. An armrest for a passenger seat, the armrest comprising: a first side; a second side opposite from the first side, wherein the first side and the second side define a length of the armrest, and wherein the length is greater than a width of the armrest; and a top surface extending between the first side and the second side, wherein the top surface comprises a first zone between the first side and the second side and a second zone between the first zone and the second side, and wherein a curvature of the first zone of the top surface is different from a curvature of the second zone of the top surface.

Example 17. The armrest of any preceding or subsequent examples or combination of examples, wherein the first zone of the top surface is planar and wherein the second zone of the top surface comprises a concave curvature.

Example 18. The armrest of any preceding or subsequent examples or combination of examples, wherein the first zone of the top surface comprises a concave curvature and wherein the second zone of the top surface comprises a concave curvature.

Example 19. The armrest of any preceding or subsequent examples or combination of examples, wherein the armrest further comprises a forward end and an aft end opposite from the forward end, wherein the first side and the second side extend between the forward end and the aft end, and wherein at least a portion of the first zone of the top surface is between the second zone of the top surface and the forward end.

Example 20. The armrest of any preceding or subsequent examples or combination of examples, wherein a width of the second zone of the top surface at the forward end is greater than a width of the first zone of the top surface.

Example 21. The armrest of any preceding or subsequent examples or combination of examples, wherein the armrest further comprises at least one forearm support pivotably coupled to the forward end of the armrest.

Example 22. The armrest of any preceding or subsequent examples or combination of examples, wherein the second zone of the top surface comprises a concave curvature in a direction extending between the forward end and the aft end and in a direction extending between the first side and the second side.

Example 23. A passenger seat assembly comprising: a base; at least one backrest; and at least one armrest according any preceding or subsequent examples or combination of examples.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An armrest for a passenger seat, the armrest comprising:
    a forward end;
    an aft end opposite from the forward end, wherein the aft end is configured to attach to the passenger seat such that the armrest is pivotable about a first axis;
    a top surface, wherein the top surface comprises a first zone and a second zone, and wherein the first zone of the top surface comprises a concave curvature; and
    at least first and second forearm supports pivotably coupled to the forward end of the armrest, wherein the at least first and second forearm supports is pivotable in a side-to-side direction relative to the top surface between a stowed position, in which the first and second forearm supports are adjacent and in contact with each other, and a deployed position, in which forward ends of the at least first and second forearm supports are spaced apart from each other, and wherein the at least first and second forearm supports at least partially forms the top surface and the top surface extends from the aft end to the at least first and second forearm supports.

2. The armrest of claim 1, wherein at least a portion of the second zone is between the first zone and the forward end of the armrest.

3. The armrest of claim 1, wherein the second zone of the top surface is proximate to the forward end of the armrest, and wherein a width of the second zone of the top surface at the forward end is greater than a width of the first zone of the top surface.

4. The armrest of claim 1, wherein the second zone of the top surface is planar.

5. The armrest of claim 1, wherein the second zone of the top surface comprises a concave curvature, and wherein the concave curvature of the first zone of the top surface is different from the concave curvature of the second zone of the top surface.

6. The armrest of claim 1, wherein the armrest further comprises a first side extending between the forward end and the aft end and a second side opposite from the first side and extending between the forward end and the aft end, and wherein the first zone of the top surface has the concave curvature in a direction extending between the forward end and the aft end and in a direction extending between the first side and the second side.

7. An armrest for a passenger seat, the armrest comprising:
a forward end;
an aft end opposite from the forward end; and
a top surface, wherein the top surface comprises a first zone, a second zone, and a third zone, wherein a curvature of the first zone of the top surface is different from a curvature of the second zone of the top surface, wherein the third zone extends from the forward end to the aft end, and wherein a curvature of the third zone of the top surface is different from the curvature of the first zone of the top surface and different from the curvature of the second zone of the top surface; and
first and second forearm supports pivotably coupled to the forward end, wherein the first and second forearm supports pivotable in a side-to-side direction relative to the top surface between a stowed position, in which the first and second forearm supports are adjacent and in contact with each other, and a deployed position, in which forward ends of the first and second forearm supports are spaced apart from each other, and wherein the first and second forearm supports at least partially define the top surface which extends from the aft end to the forward ends of the first and second forearm supports.

8. The armrest of claim 7, wherein the first zone of the top surface comprises a concave curvature and wherein the third zone of the top surface is planar.

9. The armrest of claim 7, wherein the third zone of the top surface is proximate to the forward end of the armrest, and wherein a width of the third zone of the top surface at the forward end is greater than a width of the first zone of the top surface.

10. The armrest of claim 7, wherein the armrest further comprises a first side extending between the forward end and the aft end and a second side opposite from the first side and extending between the forward end and the aft end, and wherein the first zone of the top surface comprises a concave curvature in a direction extending between the forward end and the aft end and in a direction extending between the first side and the second side.

11. An armrest for a passenger seat, the armrest comprising:
an aft end; and
at least first and second forearm supports, each of the at least first and second forearm supports comprising a forward end, wherein the at least first and second forearm supports is pivotable in a side-to-side direction relative to a top surface between a stowed position, in which the at least first and second forearm supports are adjacent and in contact with each other, and a deployed position, in which the forward ends of the at least first and second forearm supports are spaced apart from each other and pivotable about an upright pivot axis between the aft end and the forward end,
the top surface extending from the aft end to the forward end, wherein the top surface comprises at least a first zone and a second zone wherein a curvature of the first zone of the top surface is different from a curvature of the second zone of the top surface.

12. The armrest of claim 11, wherein the first zone of the top surface is planar and wherein the second zone of the top surface comprises a concave curvature.

13. The armrest of claim 11, wherein the first zone of the top surface comprises a concave curvature and wherein the second zone of the top surface comprises a concave curvature.

14. The armrest of claim 11, wherein a first side and a second side extend between the forward end and the aft end, and wherein at least a portion of the first zone of the top surface is between the second zone of the top surface and the forward end.

15. The armrest of claim 14, wherein at least one of the first and second forearm supports is pivotably coupled to a forward end of the armrest.

16. The armrest of claim 14, wherein the second zone of the top surface comprises a concave curvature in a direction extending between the forward end and the aft end and in a direction extending between a first side and a second side.

17. The armrest of claim 11, wherein the first zone comprises a first visual indicator and the second zone comprises a second visual indicator different from the first visual indicator.

* * * * *